DE WITT C. HARRIS.
TYPE WRITER.
APPLICATION FILED APR. 15, 1912.

1,115,311.

Patented Oct. 27, 1914.
9 SHEETS—SHEET 9.

Witnesses:
J. C. Devick.
C. Paul Parker.

Inventor:
De Witt C. Harris
By Luther L. Miller
Atty.

UNITED STATES PATENT OFFICE.

DE WITT C. HARRIS, OF FOND DU LAC, WISCONSIN, ASSIGNOR, BY MESNE ASSIGNMENTS, TO HARRIS TYPEWRITER MANUFACTURING COMPANY, OF FOND DU LAC, WISCONSIN, A CORPORATION OF WISCONSIN.

TYPE-WRITER.

1,115,311.      Specification of Letters Patent.      Patented Oct. 27, 1914.

Application filed April 15, 1912. Serial No. 690,756.

*To all whom it may concern:*

Be it known that I, DE WITT C. HARRIS, a citizen of the United States, residing at Fond du Lac, in the county of Fond du Lac and State of Wisconsin, have invented certain new and useful Improvements in Typewriters, of which the following is a specification.

One of the objects of my invention, broadly stated, is to provide a typewriter which may be more quickly and conveniently assembled than those heretofore produced; in which the operating mechanisms may be tested and adjusted before being mounted in the machine; and in which said operating mechanisms are conveniently withdrawable from the framework of the machine to facilitate the repairing thereof. I accomplish this object by assembling portions of the operating mechanism into a unitary structure complete in itself before mounting the mechanism in the framework of the machine, said unitary structure being fixed in place in the framework by a few simple fastenings such as screws. The result of this arrangement is that the elements comprising such a unitary structure may be assembled in the factory without its being necessary to pass the whole aggregate structure and framework of the typewriter along from one workman to another during the operation of assembling the parts. Also by thus assembling the mechanisms into a unit the operation of the elements of the unit may be tested and inspected and any necessary adjustments made therein before placing the unit in the machine. Furthermore, when it becomes necessary to repair a portion of the mechanism the unit may be readily withdrawn as a whole from the machine.

A further object of the invention is to improve the construction of the type bar segment and the support therefor.

In the accompanying drawings, Fig. 4 is a perspective view of the main frame of said lower action unit. Figs. 21 to 24 are detail views illustrating the ribbon guide and vibrator.

I will herein show and describe in detail the preferred embodiment of my invention, but it should be understood that I do not thereby intend to limit the invention to the form herein disclosed but aim to cover in the appended claims all modifications and equivalents falling within the scope of the invention.

Figure 2:
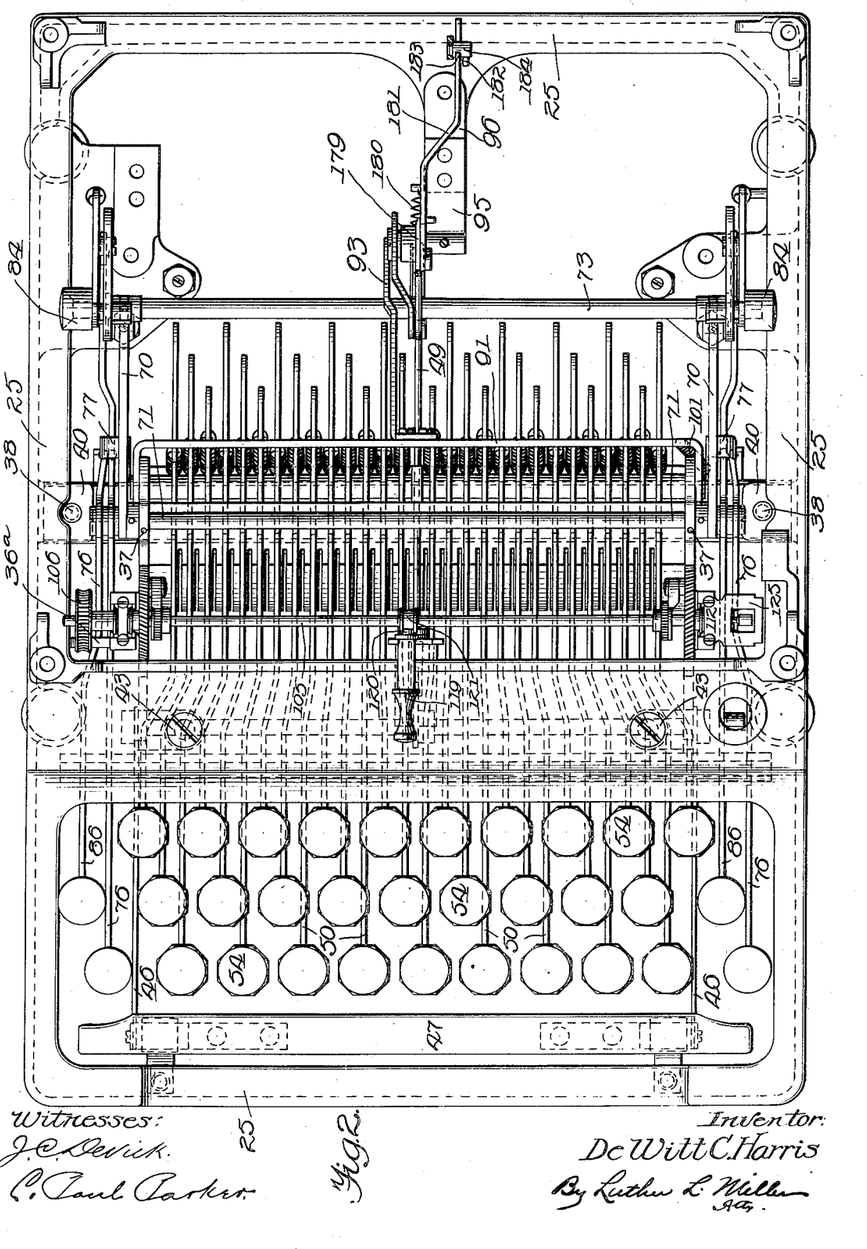
Fig. 2 is a plan view of the machine with the carriage and its operating mechanism and also the deck removed.
Figures 5, 6, 8, 9:
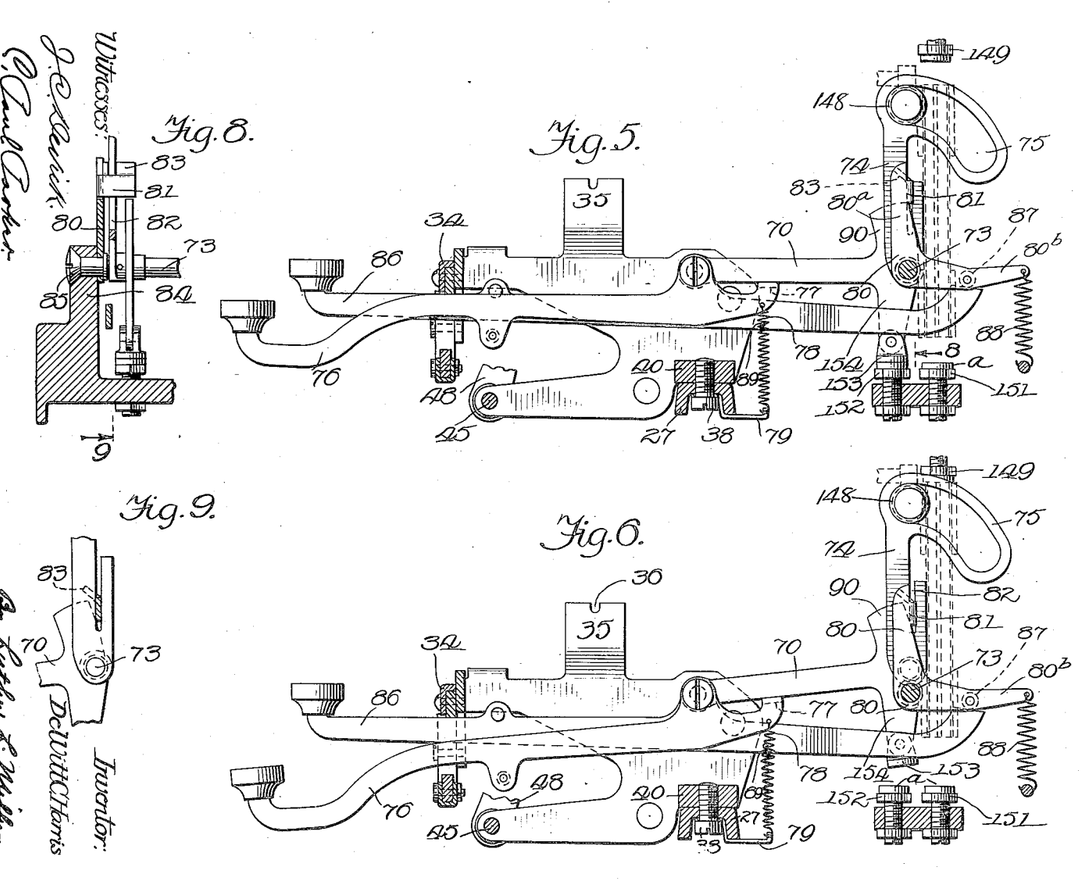
Figs. 5, 6 and 7 are vertical sectional detail views illustrating in side elevation the shifting mechanism in its three different positions.
Fig. 8 is a section on line 8 of Fig. 5.
Figs. 9 and 10 are fragmental sectional details taken in the plane of line 9 of Fig. 8 and showing the parts in two different positions.

The present machine comprises a suitable framework consisting of a lower or base portion 25 and the upper or deck portion 26. The entire "lower action" of the machine, that is to say, the key levers and their cooperating parts, the shift levers and connections, the spacer lever, the universal bar for the ribbon vibrator, and also a portion of the ribbon spool rotating means, is assembled in a structural unit complete in itself before being mounted in the framework of the machine. The frame of this unit is illustrated in Fig. 4 and comprises a horizontal bar 27, two end plates 28 and 29, a forward and a rear guide comb 30 and 31 respectively for the key levers, and a guide comb 32 for the bell cranks comprised in the key lever mechanism, said frame parts being secured together in any suitable way. The comb 32 comprises a base 32$^a$ which is attached to the under side of the bar 27 by suitable means such as screws 33, the comb portion 32$^b$ being curved upwardly and rearwardly to guide the series of bell cranks in their pivotal movement, as will be later described. The ends 30$^a$ of the forward comb 30 extend beyond the end plates 28 and 29 to provide guides for the shift levers. Mounted on said forward comb is a stop or buffer device 34 (Figs. 3 and 5) which determines the extent of swinging movement of the key levers. The upper edges of the end plates 28 and 29 have ears 35 thereon in which are formed bearing notches 36 adapted to receive the horizontal shaft comprised in the ribbon feeding mechanism. A lug 36$^a$ has an opening 36$^b$ therein which forms a bearing for the forward end of the shaft (not shown), which drives the horizontal ribbon feeding shaft above mentioned. Said upper edges of the end plates also have bearing recesses 37 therein, in which the lower ends of the ribbon spool shafts are arranged to be rotatably seated. This unit frame, carrying the series of key levers and other parts, is arranged to be secured in the machine in the present instance by screws 38 passing through openings 39 in the ends of the bar 27 and being threaded into the lower side of lugs 40 projecting inwardly from the base 25 of the framework of the machine. Upon the vertical end plates 28 and 29 are two horizontal inwardly projecting ears 41 having threaded openings 42 therein adapted to receive screws 43 (Fig. 2) passing downwardly through a portion of the base 25 and being threaded in said openings. The screws 38 and 43 thus support the frame of the lower action unit firmly in place and constitute attaching means which is of a very simple nature so that the unit may be readily mounted in the machine and removed therefrom at will when it is desired to repair any of the parts.

Figure 3:
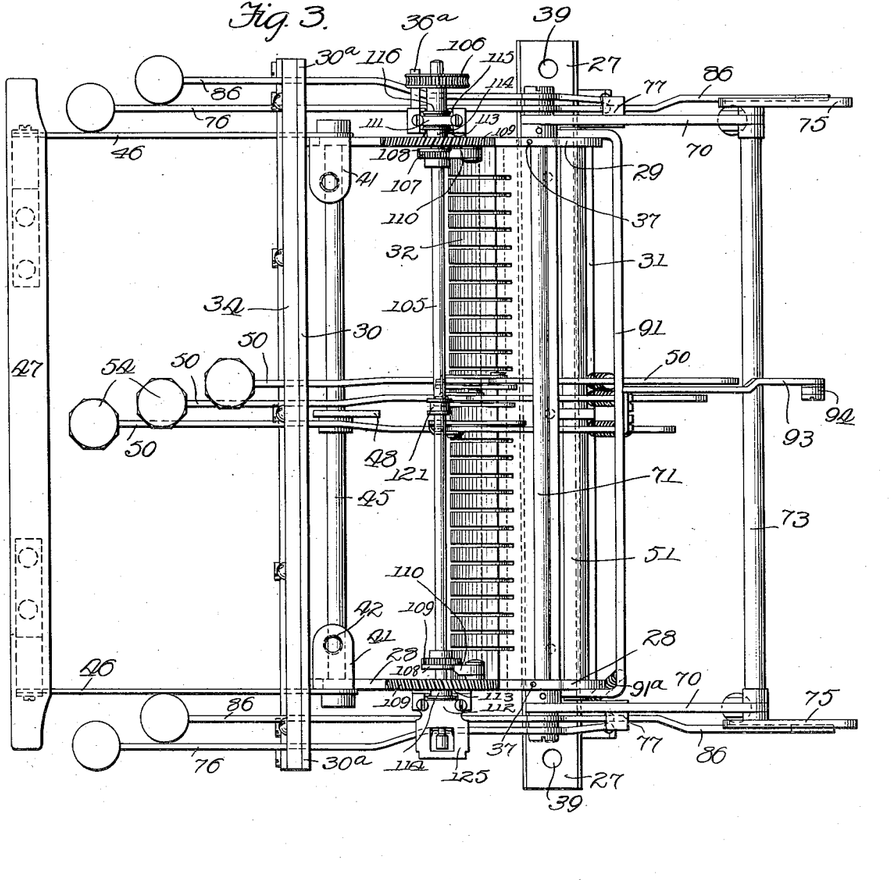
Fig. 3 is a plan view of the "lower action unit" shown separated from the machine frame.

Mounted in bearings 44 in the end plates 28 and 29 of the unit frame is a rock shaft 45 (Fig. 3). The arms 46 at the ends of the space bar 47 have their rear ends fixed upon this rock shaft 45. To the middle portion of said rock shaft is fixed an upwardly extending arm 48 having its upper end connected to the forward end of a link 49 (Fig. 1) running to the carriage escapement mechanism.

The key levers 50 are pivoted upon a shaft 51 having its ends fixed in openings 52 in the end plates 28 and 29 of the unit frame. (See Figs. 11, 12 and 13.) Each of said levers 50 has its rear portion bent back upon itself to form an arm 53 lying edgewise alongside and above the body of the lever, said arm being mounted on the key lever shaft 51 and the body of the lever running beneath said shaft. This arrangement provides a resiliency in the key which is very desirable. The key levers 50, being in three banks upon the keyboard and all being mounted on the same shaft, are necessarily of three series differing in length. In order that the resiliency of all of the key levers may be uniform the portions of said levers rearwardly of the pivot shaft 51 are made in three different lengths for the three series of levers to compensate for the difference in the leverage of their forward portions. Thus the shortest levers have longer portions rearwardly of the pivot shaft than the longer levers. The forward ends of the levers 50, carrying the keys 54, are normally maintained in their uppermost position by a series of coiled springs 55, each having its upper end engaging in an opening 56 in one of the key levers rearwardly of the pivot shaft 51 and being secured at its lower end in one of a series of openings formed in the rear edge of the base plate 32$^a$ of the guide comb 32. Preferably a plurality of openings 56 is formed in each of the levers 50, the springs 55 being attached to the longer key levers at respectively greater distances rearwardly from the shaft 51 than to the shorter levers. Thus the springs exert the greatest pull upon the longest levers.

The function of the springs 55 is to hold the key levers 50 in their normal position and to return said key levers to such position after a depression of the levers. So far as the springs tend to resist the depression of the key levers, the former would be objectionable, and this is especially true when the operator is writing fast and the key levers are being depressed by quick sharp strokes, because more force is required to move the parts of the key lever action suddenly and rapidly; and it is therefore desirable, under these circumstances, that the least possible resistance be offered to the depression of the key levers. The present construction provides for this in the following manner: When one of the key levers is depressed sharply and rapidly, the key lever body yields downwardly away from the arm 53, and thus while the various parts of the key lever action are operated in the usual way to raise the type bar 65, the opening 56 in which the upper end of the spring 55 is attached does not travel upwardly to place additional tension upon the spring 55, but said spring remains at substantially the same tension on account of the relative yielding movement between the body of the key lever and the arm 53. Thus when the operator is writing fast the additional resistance to the depression of the key levers which would ordinarily be exerted by the springs 55 by reason of their increased tension is eliminated. In order that the extent of travel or depression of all the keys may be uniform I provide the stop device 34 for the key levers 50 (see Figs. 11 to 14) comprising in the present instance an open frame which is attached to the forward guide comb 30, and through which the key levers extend. Said frame comprises an upper bar 34$^a$ and a lower bar 34$^b$ to each of which is secured a strip of leather or other suitable material 34$^c$ and 34$^d$ arranged to stop and cushion the upper and lower movements of the key levers. Upon the lower buffer strip 34$^d$ is formed a plurality of steps 34$^e$ of three different heights, the lowermost steps forming stops for the shortest series of levers 50, the middle steps for the levers of medium length, and the highest steps for the longest levers. Thus the three series of levers are limited to swing through arcs of different lengths, but all of the keys 54 have a uniform distance of travel owing to the difference in the length of the levers.

The mechanism for connecting the key levers with the type bars will now be described. Pivotally mounted on a shaft 57 (Fig. 11) which has its ends fixed in openings 58 in the end plates 28 and 29 of the lower unit frame is a plurality of bell crank levers 59, one for each of the key levers 50. The shorter arms 60 of said bell cranks are connected by links 61 with the forward ends of the arms 53 on the key levers, while the longer vertical arms 62 of the bell cranks are connected through horizontal links 63 with short arms 64 on the bases of the type bars 65. (See Fig. 1). In order to obtain the most efficient arrangement of this mechanism, the elements of each individual key lever action are constructed and connected in such relation that each of the pivoted elements is swung by a force exerted approximately at right angles to the radius of the element.

Figures 1, 21, 22, 23:
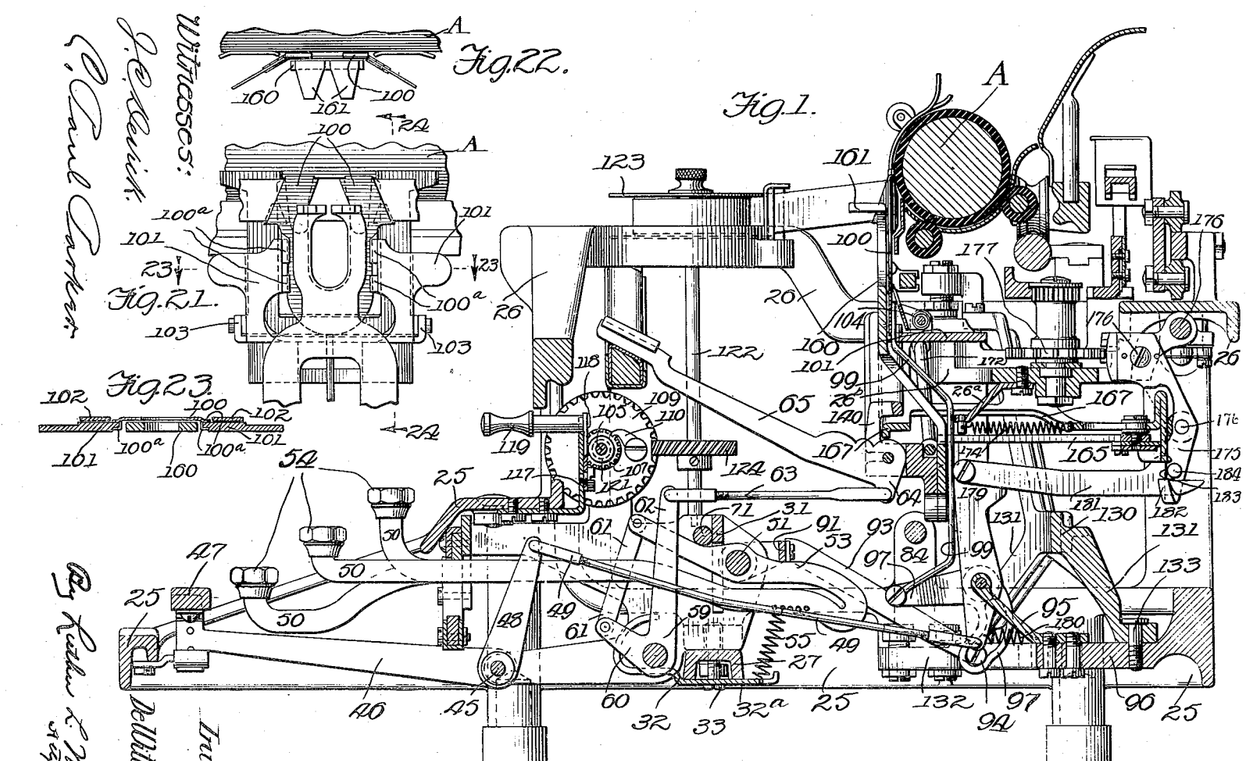
Figure 1 is a vertical central section through a typewriter embodying the features of my invention.
Fig. 21 is a fragmental front elevation of said ribbon guide and its associated parts.
Fig. 22 is a fragmental plan view.
Fig. 23 is a horizontal section on line 23 23 of Fig. 21.

Referring to Fig. 1, it will be seen that the link 63 extends at a right-angle to the arm 64 on the type bar and to the long arm 62 of the bell crank. Also the link 61 acts at right angles to the short bell crank arm 60 and the arm 53 on the key lever. Thus the force required to depress one of the keys 50 is reduced to a minimum. The type bar segment is arc-shape and the bases of the type bars are mounted on said segment at gradually increasing heights from the middle of the series to the outer ends thereof. To maintain a horizontal pull of the links 63 at right angles to the arms 64 on the type bars the vertical arms of the bell crank levers are gradually increased in length from the middle of the series outward so that their upper ends will describe an arc corresponding to the positions of the bases of the type bars. Since the arc of swinging movement of the type bars 65 is uniform throughout the entire series, the length of reciprocation of the upper ends of the longer bell crank arms 62 must be the same for all of said arms in spite of the fact that they differ in length from the middle of the series outward. Thus while the shortest of these vertical bell crank arms 62 swings through the same rectilinear distance as the longest arms, the angle through which said shortest arm swings will be greater than the angle of movement of the longest arm, and this angle will gradually decrease from the shortest arm in the center of the series to the longest arms at the outer ends thereof. Now in any one bank of the key levers 50 the arc of movement of all the levers is identical because the keys must all have a uniform distance of travel, and in order to communicate this uniform arc of movement of the key levers to the bell cranks 59 in such a way that the upper ends of the longer arms will move through the same rectilinear distance, the proportions and relations of the elements of each key action are varied corresponding to the varying lengths of the longer arm 62 of the bell cranks. This is accomplished in the present instance by varying the length of the portion of the key lever arm 53 forwardly of its shaft 51, varying the length of the short arms 60 of the bell cranks and also of the links 61, and varying the angles between the short arms and the long arms of the bell cranks to suit the peculiar movement of each key lever action.

Figures 12, 13, 14:
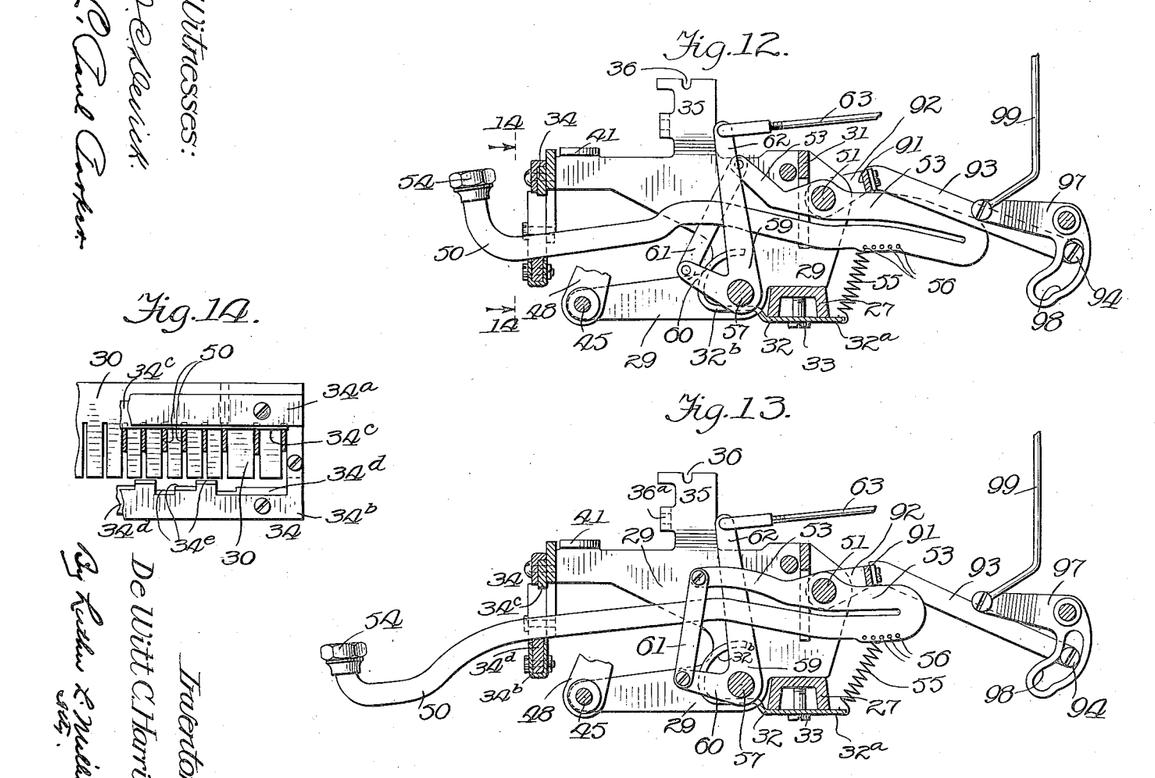
Fig. 14 is a fragmental vertical sectional view taken in the plane of line 14 14 of Fig. 12 illustrating the stop and buffer device for the series of key levers.
Figure 15:
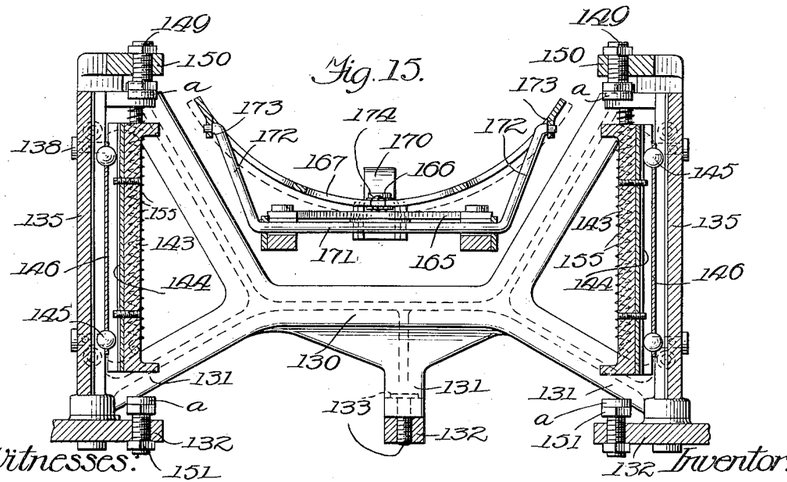
Fig. 15 is a vertical section on line 15 15 of Fig. 19 through the type bar segment and its support, the view also showing the universal yoke for transmitting motion from the type bars to the carriage escapement mechanism.
Figure 16:
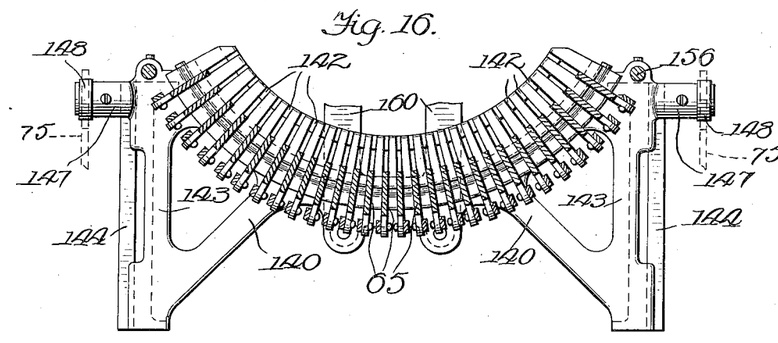
Fig. 16 is a vertical sectional view taken in a plane running through the base of the series of type bars and showing the type bar segment in elevation.
Figure 17:
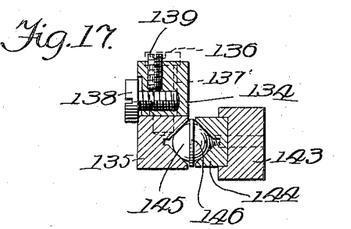
Fig. 17 is a horizontal section through the guide means for the type bar segment.
Figure 18:
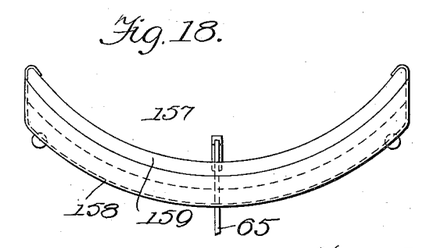
Fig. 18 is a front elevation of the cushion or support for the series of type bars.
Figure 19:
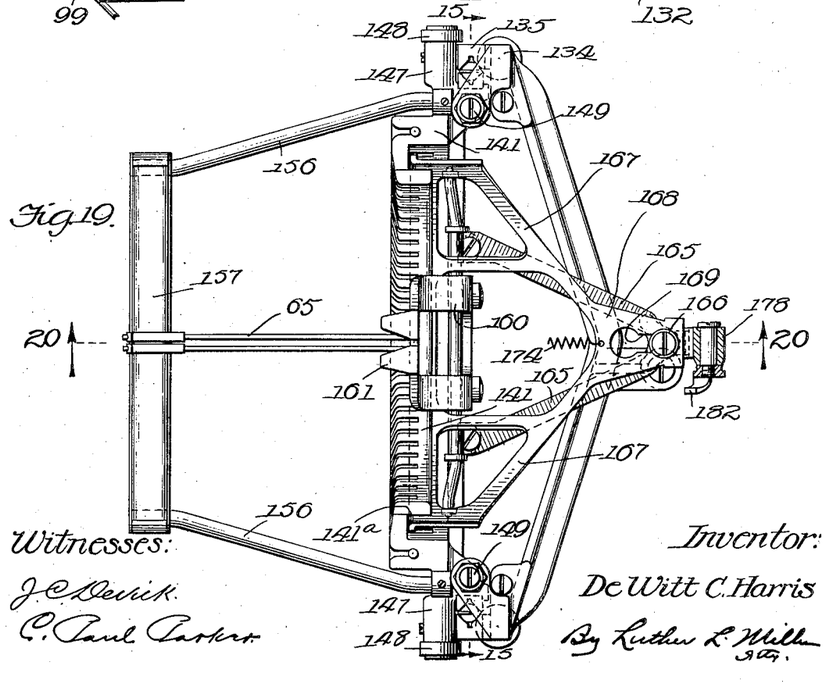
Fig. 19 is a plan view of the unitary structure which includes the type bar segment and associated parts, showing said structure detached from the framework of the machine.
Figures 20, 24:
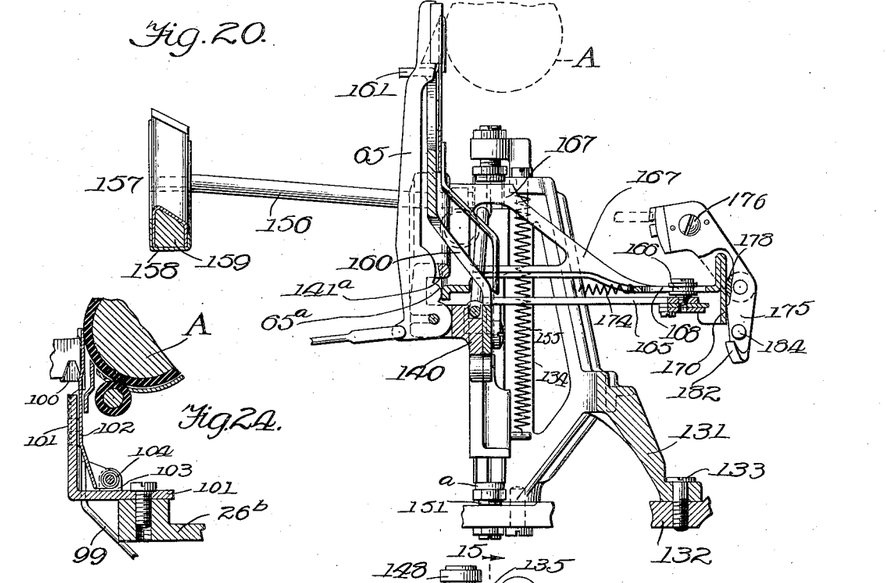
Fig. 20 is a vertical section through the last mentioned unit taken in the plane of line 20 20 of Fig. 19.
Fig. 24 is a fragmental section taken in a vertical plane running from front to rear of the machine.

Referring to Fig. 12 which shows a key lever action comprising one of the shortest key levers and one of the shortest vertical arms 62 of the bell crank levers; let us suppose that the vertical arm 62 of the bell crank is lengthened to correspond to one of the outer key lever actions. The upper end of this lengthened arm, while it would travel through the same rectilinear distance as above explained, would swing through a smaller angle with reference to a circle than a short arm. As before stated, however, all of the key levers 50 in a single series swing through the same arc and the forward portion of the key lever arms 53 would likewise, if they were all of equal length, swing through arcs of the same length. Therefore in order that the constant and uniform length of swinging movement of the key levers will be transmitted to the longer arms of the bell cranks so as to swing them through different arcs and cause their outer ends to move through the same rectilinear distance, the shorter arm 60 of the bell crank in the example above supposed would be lengthened so that movement communicated to it from the key lever arm 53 through the link 61 would move it through a smaller arc and therefore would move the longer arm of the bell crank through a smaller arc, thus carrying its outer end through the desired distance of reciprocation. Thus far one element of the problem has been solved, namely, to vary the length of a shorter arm 60 in proportion to the increasing length of the longer arm 62 so that said arms will be moved through smaller arcs to maintain the rectilinear movement of the outer ends of the longer arms constant for transmission to the links 63 and type bars 65.

As above explained, it is desirable in order to obtain the most effective arrangement that the force exerted upon a pivoted part should work at right angles thereto. Therefore the forward portion of the key lever arm 53 and the shorter arm 60 of the bell crank are maintained in substantially parallel relation in order that the link 61, if at right angles to one, will be at right angles to both. Thus a line joining the center of the key lever shaft 51 and the pivotal center of the upper end of the link 61 will be approximately parallel to a line joining the center of the bell crank shaft 57 and the pivotal center of the lower end of the link 61. Now if the shorter bell crank arm 60 is lengthened to correspond to the longer arm of the bell crank, the lower end of the link is moved forwardly which would destroy its right angular relation if other adjustments were not made. Therefore the forward end of the key lever arm 53 is lengthened to also move the upper end of the link forwardly. The relation in length of the forward ends of the key lever arm 53 and the short arms 60 of the bell crank levers is definite, say, for example, 3 to 2. Therefore in changing said lengths to correspond to the varying length of the long bell crank arm 62 the key lever arm 53 would be lengthened three units to two units of increased length in the short arm of the bell crank. In other words, the upper end of the link 61 would be advanced forwardly more rapidly than the lower end which would result in destroying the right-angular relation of the link to the arms 53 and 60. To overcome this difficulty the angles between the short and long arms of the bell cranks are varied and the angle with reference to a horizontal line of the forward portion of the key lever arm 53 is also varied, the bell crank angle being increased for longer arms and the key lever arm correspondingly approaching a more nearly horizontal position, it being understood that the vertical arms of the bell cranks are maintained in a vertical position. From this it will be seen that, given a uniform arc of movement of the entire series of key levers, a uniform arc of movement of the entire series of type bars, and a varying length of the longer arms 62 of the bell cranks, movement is transmitted from the key levers to the bell cranks in such a manner as to cause the upper ends of all of the vertical bell crank arms to move through a uniform distance of reciprocation, at the same time maintaining in each case the right-angular relation of the parts as described so as to have the most effective movement thereof and also permitting the use of an advantageous form of resilient key lever.

Figure 11:
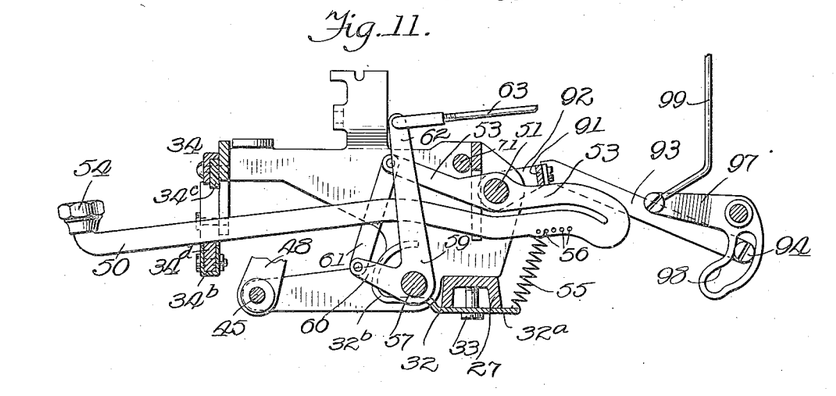
Figs. 11, 12 and 13 are vertical sectional detail views showing the key lever mechanism and the ribbon vibrating means in side elevation.

What has been said with reference to the key lever action for the shortest length of key lever, as shown in Fig. 12, applies generally to the action of the medium length key lever illustrated in Fig. 11, and to the longest lever shown in Fig. 13. Owing to the fact, however, that the three series of levers swing through different angles of movement in order to maintain the travel of the keys 54 uniform for the three series, the length of the forward ends of the arms 53 will necessarily be different in the three series of levers for any given length of the vertical arms 62 of the bell cranks 59. For, given one length of said long bell crank arm, to move said arm through the same arc the forward end of the arm 53 of one of the longest key levers will necessarily be longer than the forward end of the arm 53 of one of the shortest key levers since the former key lever swings through a shorter arc of movement than the latter key lever, which movement must be increased in the case of the former lever by lengthening the arm 53 in order to obtain the same swinging movement of the bell crank lever. In each series of key levers, however, the same variations of parts to compensate for the differences in the vertical arms 62 of the bell cranks will occur.

The present machine is of the class known as "three-type machines." Each of the type bars carries three characters, the middle row of type on said bars being used in ordinary writing and the upper and lower (or inner and outer) rows comprising capital letters, figures, and other characters. In the machine herein shown, the type-bar segment carrying the type bars is arranged to be shifted in opposite directions to bring the upper and lower rows of type into position to be used. Normally the type bar segment is in its middle position. The mechanism for raising or lowering said segment as desired comprises a pair of arms 70 fixed upon the ends of a rock shaft 71 which is mounted in bearing openings 72 in the end plates 28 and 29 of the lower unit frame. In the rear ends of said arms is rotatably mounted a rock shaft 73. Upon each end of this latter shaft is fixed an arm 74 having a slotted cam 75 at its upper end in which a roller carried by the movable type bar segment lies. Said arms 74 when in their normal position thus form rigid links connecting the outer ends of the arms 70 with the type bar segment. The arms 74 are swung to raise said type bar segment, by means of either one of two shift levers 76 located at opposite sides of the machine, each of said levers being pivoted near its rear end on one end of the rock shaft 71 and having an inwardly extending finger 77 which underlies the adjacent arm 70. Since both arms 70 are fixed on the rock shaft 71, when the outer end of either of the levers 76 is depressed the arms 70 will be swung upwardly and the type bar segment will be raised. Each of the shift levers 76 is held in its normal position by a coiled spring 78 attached at its upper end to the rear end of the lever and at its lower end to a bracket 79 held in place by one of the unit mounting screws 38.

The type bar segment is lowered by swinging the cam arms 74 forwardly, which will cause the slotted cams 75 carried by the upper ends of said arms to draw the rollers on the segment downwardly. Said arms are swung by similar means at opposite sides of the machine, each means comprising a bell crank lever 80, the arm 80$^a$ of which lies alongside the arm 74 and has a finger 81 extending into a slot 82 in the arm 74. A flange 83 on said finger lies at the side of said arm opposite to said bell crank lever. The bell crank lever 80 is pivoted on a lug 84 on the base 25 of the machine, the pivot 85 being in alinement with the rock shaft 73 when the latter is in its lower or normal position. A shift lever 86 pivoted between its ends upon the rock shaft 71 is arranged to engage at its rear end a roller 87 carried by the arm 80$^b$ of the bell crank lever 80 for rocking said lever. A spring 88 attached to the arm 80$^b$ and anchored to the base of the machine normally holds the bell crank lever 80 and the arm 74 in position to maintain the type bar segment in its normal position. The shift lever 86 is held in its normal position by a coiled spring 89 attached to said lever and to the bracket 79. Both of the arms 74 being fixed on the rock shaft 73, when either of the shift levers 86 at opposite sides of the machine is depressed, both arms 74 will be swung to lower the type bar segment.

When the type bar segment has been raised through the medium of the shift lever 76 an upright lug 90 at the rear end of the arm 70 is carried in front of the finger 81 upon the bell crank 80. Therefore it will be impossible to swing said bell crank by depressing the segment-lowering lever 86. Likewise, when said segment-lowering lever has been depressed, the segment-raising lever 76 cannot be depressed to raise the segment because the finger 81 on the bell crank has been moved above the lug 90 on the arm 70. Thus only one of the segment-moving means can be operated at a time. The lugs 90 also assist in preventing upward bouncing of the segment when shifted downwardly to its lowermost position by reason of the overlying relation of the fingers 81 to the lugs 90. Said lugs also prevent upward movement of the segment through momentum when the latter is returning from its lowermost to its middle or normal position, because the finger 81 continues to overlie the lugs 90 until the end of movement of the segment. The cams 75 by reason of their shape also assist in preventing movement of the segment through momentum or from bouncing.

The means for vibrating the ribbon comprises a universal bar 91 normally resting upon the series of key levers rearwardly of the key lever shaft 51, said universal bar having arms 92 at its ends which are pivoted upon the ends of said key lever shaft 51. Thus when any one of the key levers is depressed, the universal bar 91 will be raised. Attached to the middle portion of said universal bar is a rearwardly projecting arm 93 (see Figs. 11, 12 and 13) carrying an antifriction roller 94 at its rear end. Pivotally mounted upon a bracket 95, which is fixed to a lug 96 upon the base frame, (see Fig. 1) is a bell crank 97 having a cam slot 98 in its vertical arm, which slot receives the roller 94 upon the arm 93 of the universal bar. The horizontal arm of said bell crank lever 97 is attached at its end to a vertical link 99 which carries at its upper end a ribbon guide 100, said ribbon guide being mounted for vertical movement on a guide portion to be presently described. The universal bar 91 is yieldably held in its lowermost position or against the series of key levers by a coiled spring 91$^a$ attached at its upper end to said bar and having its lower end secured to one of the brackets 79.

Mounted upon a lug 26$^b$ which extends inwardly from the rear portion of the deck 26 (see Fig. 1 and Figs. 21 to 24) is an L-shape bracket 101, the horizontal base of which is secured to said lug and the vertical portion of which is bifurcated to form a guideway for the ribbon guide 100. Said ribbon guide has grooves at opposite sides thereof to receive the inner edges of the bifurcated bracket arm, the grooves preferably being formed by bending fingers 100$^a$ from the ribbon guide to lie at opposite sides of said bracket arm, as shown most clearly in Fig. 23. The line-finder 102 is pivotally mounted in upstanding ears 103 upon opposite sides of the bracket 101, said line-finder being pressed rearwardly against the platen A by a torsion spring 104. (See Fig. 1.) The center guide 160 is fixed to and forms a part of the type bar segment unit to be later described.

Owing to the fact that the three series of key levers 50 are of different lengths, and the forward ends of said levers can be depressed only through the same distance, the rear ends of said levers upon which the universal bar 91 rests will move through different distances. When one of the shortest key levers is depressed, the universal bar will be raised through its maximum movement, and when one of the longest key levers is operated, the bar will move through its shortest travel. In order that this varying movement of the universal bar 91 may transmit to the ribbon guide 100 a uniform length of reciprocation, the cam slot 98 is so formed that the swinging movement will be imparted to the bell crank lever 97 during the initial rising movement of roller 94 in the cam slot 98, the upper end of said slot being formed in a dwell which extends on the arc of a circle having a radius of a length equal to the distance between the center of the shaft 51 and the roller 94. Thus when one of the longest key levers is depressed, which results in the shortest movement of the universal bar 91 and its arm 93, the bell crank lever 97 will be swung its full movement, and when one of the shortest key levers is operated, the bell crank lever 97 will be swung through its full extent during the initial travel of the roller 94, said bell crank being unaffected by the latter portion of the rising movement of said roller.

Figs. 11, 12 and 13 represent the universal bar 91, arm 93 and roller 94 in the positions they occupy when a medium length key lever, a short length, and a long key lever, respectively, have been depressed. Not only does the cam slot 98 equalize the movement of the three lengths of key levers, but it also accommodates the different positions of the key levers caused by the three positions of the type bar segment. Said segment acts through the links 63 and 61 and the bell cranks 59 to move the key levers slightly as the segment is shifted into its different positions, but the ribbon vibrator will be reciprocated uniformly, no matter which key lever is depressed or what position the type bar segment occupies. The cam 98 thus equalizes nine different movements of the key levers. Rotatably and slidably mounted in the bearings 36 in the end plates 28 and 29 of the lower unit frame is a horizontal shaft 105 (see Figs. 1, 2 and 3) having a worm wheel 106 slidably but non-rotatably mounted thereon at one end, which worm wheel meshes with a worm on a shaft (not shown) extending along one side of the machine and driven from the carriage-moving means. Upon the shaft 105 near opposite ends thereof are rigidly fixed two pinions 107 each having at one of its sides an annular smooth portion 108. Loosely mounted on the shaft 105 adjacent to the pinions 107 are two spiral gears 109 each having a pawl 110 pivoted thereto and arranged to engage the teeth of one of the pinions 107. The spiral gears 109 are held against lateral sliding movement by suitable means such as plates 111 and 112 mounted upon the bearing ears 35, each of said plates having lugs 113 entering annularly grooved hubs 114 upon the spiral gears. The plate 111 also has lugs 115 thereon engaging a collar 116 fixed on the worm wheel 106 for holding the latter against lateral movement. The shaft 105 is arranged to have a longitudinal movement in its bearings and with respect to the spiral gears 109 and the worm wheel 106, and the pinions 107 are so positioned on said shaft that only one of them at a time will be in mesh with one of the pawls 110. Suitable means is provided for longitudinally shifting the shaft 105, said means comprising a bracket 117 fixed to the base 25 of the machine, an arm 118 pivoted to said bracket and having a crank 119 thereon and a lug 120 on the arm 118 arranged to engage in a grooved collar 121 fixed upon the shaft 105. Thus by swinging the crank 119, the shaft 105 will be shifted longitudinally one way or the other. Shafts 122 upon the upper ends of which are fixed the ribbon spools 123 have their lower ends mounted in the bearings 37 in the upper edges of the end plates 28 and 29 of the lower unit frame. Upon each of these shafts 122 is fixed a spiral gear 124 which meshes at all times with one of the spiral gears 109 upon the shaft 105, the latter shaft being rotated constantly in one direction by the worm wheel 106. It will be seen that the direction of rotation of the ribbon spool shafts 122 will depend upon which one of the spiral gears 109 is in driving engagement with a pinion 107. When one of the pawls 110 is in engagement with a pinion 107 the other pawl rides freely upon the smooth surface 108 upon its pinion. Therefore by shifting the shaft 105 through the medium of the crank 119 the direction of travel of the ribbon may be reversed at will. Suitable means 125 carried by the plate 112 and not herein illustrated in detail is arranged to yieldably hold the shaft 105 in either of its two positions. The shaft 105, worm wheel 106, pinions 107, spiral gears 109, pawls 110, collar 121, plates 111 and 112, and shaft-holding means 125 form a portion of the lower action unit.

Figure 7:
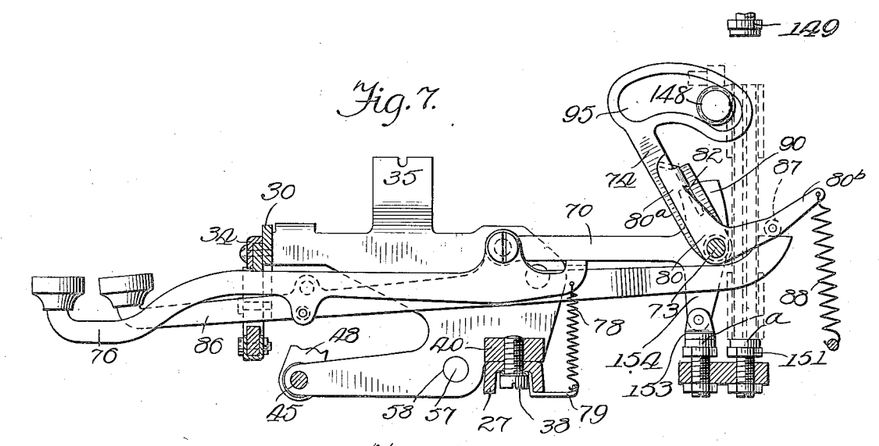
Figure 10:
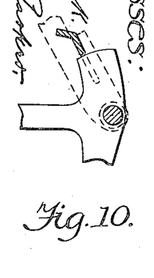

The second unitary structure in the machine herein disclosed includes the support for the type bar segment, the segment itself, the type bars, a supporting pad for the type bars, the guide plate for the type bars and the ribbon vibrator, the universal yoke for transmitting movement from the type bars to the carriage escapement mechanism, and certain stops and other minor parts. This structure, like the lower action unit above described, is assembled in a unit apart from the machine framework, and is then bodily inserted into said framework and secured by a few simple fastenings. This second unit is illustrated in Figs. 1 and 15 to 24, inclusive, and comprises a casting or bracket 130 having in the present instance three arms 131 at its lower portion adapted to rest upon lugs 132 and 96 extending inwardly from the base 25 of the machine, said arms being secured to said lugs in any suitable way as by screws 133. The bracket 130 forms a support for the various portions of the unit and comprises two vertical side portions 134 having grooved guides 135 mounted thereon. Preferably these guides 135 are mounted on the ends of screws 136 extending through slots 137 in the side portions 134 of the bracket. Said guides are adjustable laterally by screws 138 threaded in the side portions 134 and overlying said guides, the latter screws being locked by set screws 139. The type bar segment 140 comprises the arcuate portion 141 having slots 142 in which the bases of the type bars are pivoted and two sides 143 having V-grooves 144 therein complementing the grooves in the guides 135 to form races in which antifriction balls 145 are mounted. Herein I have shown two balls in each of these races, said balls being spaced apart by means of a spacer plate 146. Projecting laterally from each of the sides 143 is a stud 147 having an antifriction roller 148 mounted thereon, which roller is positioned in the slot of the cam 75 of the shifting mechanism. Stops 149 are carried upon lugs 150 in the upper ends of the sides 134 of the support to limit the upward sliding movement of the segment. Similar stops 151 are mounted beneath the segment to determine its lowermost sliding movement, as caused by the swinging of the slotted cam 75, the latter stops 151 being in the present instance mounted in the lugs 132 upon the frame. Stops 152 (Figs. 5 to 7) which may be mounted in said lugs 132 are adapted to be engaged by a shoe 153 carried upon a downwardly extending lug 154 upon each arm 70 of the segment-raising means. This latter stop determines the normal position of the type bar segment by halting the downward movement of the segment after it has been raised by one of the shift levers 76. These stops may be of any suitable form, such as screws seated in their supports and carrying at their ends buffer plates $a$ of suitable material such as fiber or the like. Coiled springs 155 secured to the sides 143 of the type bar segment and to the bracket 130 counterbalance the weight of said segment to render operation thereof easier.

The type bars 65 have their bases pivotally mounted in the slots 142 in the segment 141. At their forward ends the type bars carry type each having three characters thereon. A pair of arms 156, having their rear ends fixed in the type bar segment, carry at their forward ends an arcuate support 157 for the forward ends of the type bars. Said support may comprise a channel 158 of sheet metal in which is mounted a cushion 159 of any suitable material. A center guide plate 160 having its base attached to the middle portion of the type bar segment extends upwardly and has a notched flange 161 thereon adapted to guide the type bars into correct striking position.

Projecting rearwardly from the segment 140 is a bracket 165 having its base secured to said segment, the rear portion of said bracket having a guide roller 166 mounted thereon. A universal yoke 167 has an arm 168 at its rear end, said arm having a slot 169 therein which receives the roller 166 and guides the yoke 167 in its horizontal reciprocation. The rear end of the arm 168 is bent to form a vertical abutment 170 adapted to engage and swing a lever constituting a portion of the escapement mechanism, as will be later described. The forward portion of the yoke 167 is curved to conform to the curvature of the type bar segment, and has its forward edge lying in an arcuate groove 141$^a$ in the segment in position to be engaged by projections 65$^a$ upon the bases of the type bars 65 when the latter are raised into striking position. Thus at each operation of one of the type bars the yoke will be moved rearwardly to operate the escapement mechanism. The forward portion of the yoke 167 is preferably supported by a shaft 171, having its middle portion rotatably mounted in bearings on the type bar segment, the ends 172 of said shaft extending upwardly and being pivoted in ears 173 upon the yoke 167. A tension spring 174 attached at one end to the yoke and at the other end to a suitable bracket 26$^a$ screwed to the deck 26 normally maintains the yoke 167 in its foremost position.

The escapement mechanism comprises a lever 175 (see Fig. 1) pivoted at 176 upon the deck 26 and operating in conjunction with a toothed wheel 177 to permit step-by-step rotation of said wheel and the carriage geared thereto, in the ordinary way. A fiber roller 178 carried by the lever 175 is at all times held in engagement with the abutment 170 on the rear end of the universal yoke 167. Pivotally mounted between its ends on the bracket 95 is a lever 179 having its lower end attached to the rear end of the link 49 which is connected with the space bar 47. A coiled spring 180 attached to the lower end of the lever 179 tends to pull said lower end rearwardly. A link 181 is pivoted at its forward end to the upper end of the lever 179, the rear end of said link being arranged to engage the escapement lever 175 to swing the latter. The connection between the link 181 and the escapement lever is not a positive one, but is such as to permit said lever to be swung rearwardly by the universal yoke 167. In the present instance the link is arranged to slide in a guide-way 182 at the lower end of the escapement lever, said link having a shoulder 183 thereon to engage a stud 184 on the lever. Thus the escapement mechanism will be operated whenever either a key lever 50 or the space bar 47 is depressed.

In the manufacture of the machine, the entire "lower action" and the "upper action," or type bar mechanism, are each assembled into a unitary structure separate from the machine frame. Each unit may then be inspected and irregularities, if any, adjusted. The lower action is inserted bodily into the base 25 from its under side and is secured in place by the screws 33 and 43. The upper unit is inserted from the top of the machine before the deck 26 and the carriage have been mounted in place, said upper unit being secured in place by the screws 133. The links 63 running from the series of bell cranks to the type bars are now connected. The deck and the carriage are then added to complete the machine. The few parts which are separately mounted on the base 25 require very little time to put into place. The entire machine may thus be assembled much more quickly and easily than machines now known.

Some of the mechanism herein disclosed is claimed in my co-pending applications Ser. Nos. 755,582 and 755,583 filed March 20, 1913, and Nos. 764,998 and 764,999 filed May 2, 1913, said applications being divisions of the present application.

I claim as my invention:

1. In a typewriter, in combination, a main framework, and a unitary structure constituting the lower action of the typewriter, said structure comprising a frame consisting of a pair of end plates, a shaft mounted in said end plates, a forward and a rear guide comb secured to said end plates at opposite ends thereof, a series of key levers pivoted between their ends on said shaft, said key levers being guided at two points by said guide combs, and means for mounting the unit frame in said main framework.

2. In a typewriter, in combination, a main framework, and a structure constituting the lower action of the typewriter and comprising a frame having end plates, a shaft mounted in said end plates, a forward and a rear guide comb having their end portions fixed to said end plates, the rear one of said guide combs being positioned adjacent to said shaft and the forward guide comb being positioned at some distance from said shaft, and a series of key levers pivoted on said shaft and guided in two places by said guide combs.

3. In a typewriter, in combination, a main framework, a lower action unit removably mounted therein and comprising a frame, a series of key levers, a guide comb for said key levers, a series of bell-crank levers connected to said key levers and adapted to be connected to a set of type bars, and a guide comb for said bell-crank levers, said key levers, bell-crank levers, and guide combs being mounted in the unit frame; and means for securing said unit frame in the main framework.

4. In a typewriter, in combination, a main framework having inwardly extending lugs, a lower action unit adapted to be inserted through the lower end of said framework, said unit comprising a frame having projections arranged to stop against said lugs, means for securing said projections and said lugs together, and a series of key levers and a guiding comb therefor mounted in said frame.

5. In a typewriter, in combination, a main framework; a unitary structure removably mounted in said framework and comprising a frame including a pair of end plates and a forward and rear guide comb extending between and secured to said end plates, a shaft mounted in said end plates, a series of key levers pivoted on said shaft and guided by said guide combs, a second shaft mounted in said end plates, a series of bell-crank levers pivoted on the second shaft and connected to said key levers, an arcuate guide comb fixed in said frame and arranged to guide said bell-crank levers; and means for securing said frame in the main framework.

6. In a typewriter, in combination, a main framework, and a separate unitary structure mounted in said framework and comprising a frame having two end pieces, a shaft mounted in said end pieces, a guide comb carried by the frame, a series of key levers pivoted on said shaft and guided by said comb, and a universal bar also pivoted on said shaft and resting on said key levers.

7. In a typewriter, in combination, a main framework, and a separate unitary structure mounted in said framework, and comprising a frame, a shaft mounted therein, a series of key levers pivoted on said shaft, a guide comb for said key levers, a second shaft mounted in said frame, a pair of arms fixed on said shaft and carrying a spacer bar at their forward ends, and a third arm fixed on the last-mentioned shaft and adapted to be connected to an escapement mechanism.

8. In a typewriter, in combination, a main framework, and a separate unitary structure secured therein and comprising a frame having mounted therein a shaft, a forward and a rear guide comb, a series of key levers pivoted on said shaft and guided at two points by said guide combs, a second shaft, a series of bell-crank levers pivoted on the second shaft and connected to said key levers, a guide comb having curved teeth to guide the arms of said bell-cranks, a third shaft having fixed thereon an arm for operating escapement mechanism, and a pair of arms fixed on said third shaft and carrying a spacer bar at their forward ends.

9. In a typewriter, in combination, a main framework, and a separate unitary structure mounted in said framework and comprising a frame having a pair of vertical guides located at opposite sides thereof, a vertically slidable type-bar segment guided by said guides, a pair of forwardly projecting arms mounted on said segment, an arcuate pad carried by said arms, and a series of type bars pivoted at their rear ends on the segment and resting at their forward ends on said pad.

10. In a typewriter, in combination, a main framework having inwardly projecting lugs, and a separate upper unitary structure comprising a frame having portions resting upon and secured to said lugs, said frame having a pair of vertical guides at its opposite sides, a slidable type-bar segment guided by said guides, a series of type-bars pivoted in said segment, a pair of arms fixed in and projecting forwardly from said segment, and a pad carried by said arms and supporting the free end of said type bars.

11. In a typewriter, in combination, a main framework having inwardly extending lugs in its lower portion, and a separate unitary structure mounted therein and comprising a frame resting upon and secured to said lugs and inclosed by said main framework, and a type-bar segment, a series of type-bars, and a supporting pad for the type-bars mounted in said frame.

12. In a typewriter, in combination, a main framework, and two unitary structures each complete in itself and independent of said framework, one of said structures constituting the lower action of the machine and comprising a frame having mounted therein a series of type-bars and a series of bell-crank levers connected together, and the other of said structures comprising a frame, a type-bar segment mounted therein, and a series of type-bars pivoted on said segment, said type-bars being arranged to be connected to said bell-crank levers by links after the two structures are mounted in the main framework.

13. In a typewriter, in combination, a main framework, a unitary structure assembled outside of said framework, and means for securing said structure in said framework, said structure comprising a type-bar segment, type-bars pivoted thereon, a support for said segment, a support for the free ends of said type-bars, and a member for communicating motion from any one of said type bars to the carriage escapement mechanism.

14. In a typewriter, in combination, a main framework, a unitary structure capable of being assembled complete outside of said framework, said structure comprising a bracket having guides thereon, a type bar segment slidably mounted on said guides, type-bars carried by said segment and a type bar support secured to said segment.

15. In a typewriter, a unitary self-contained structure comprising a frame, a series of key levers mounted in said frame, and a horizontal shaft mounted in said frame and constituting a portion of the ribbon-feeding means.

16. In a typewriter, a main framework, two unitary structures each complete in itself, and independent of said framework, one of said structures constituting the lower action of the machine and the other structure constituting the upper action thereof, each of said structures adapted to be inserted bodily into said framework, and the two structures being adapted for connection after insertion into said framework, and means for securing each of said structures as a whole to said framework.

In testimony whereof I affix my signature in the presence of two witnesses.

DE WITT C. HARRIS.

Witnesses:
FRED B. GIVENS,
G. FORD.